Jan. 4, 1944.     J. FELSCH     2,338,500
WATER CONDITIONING APPARATUS
Filed Feb. 11, 1942     2 Sheets-Sheet 1
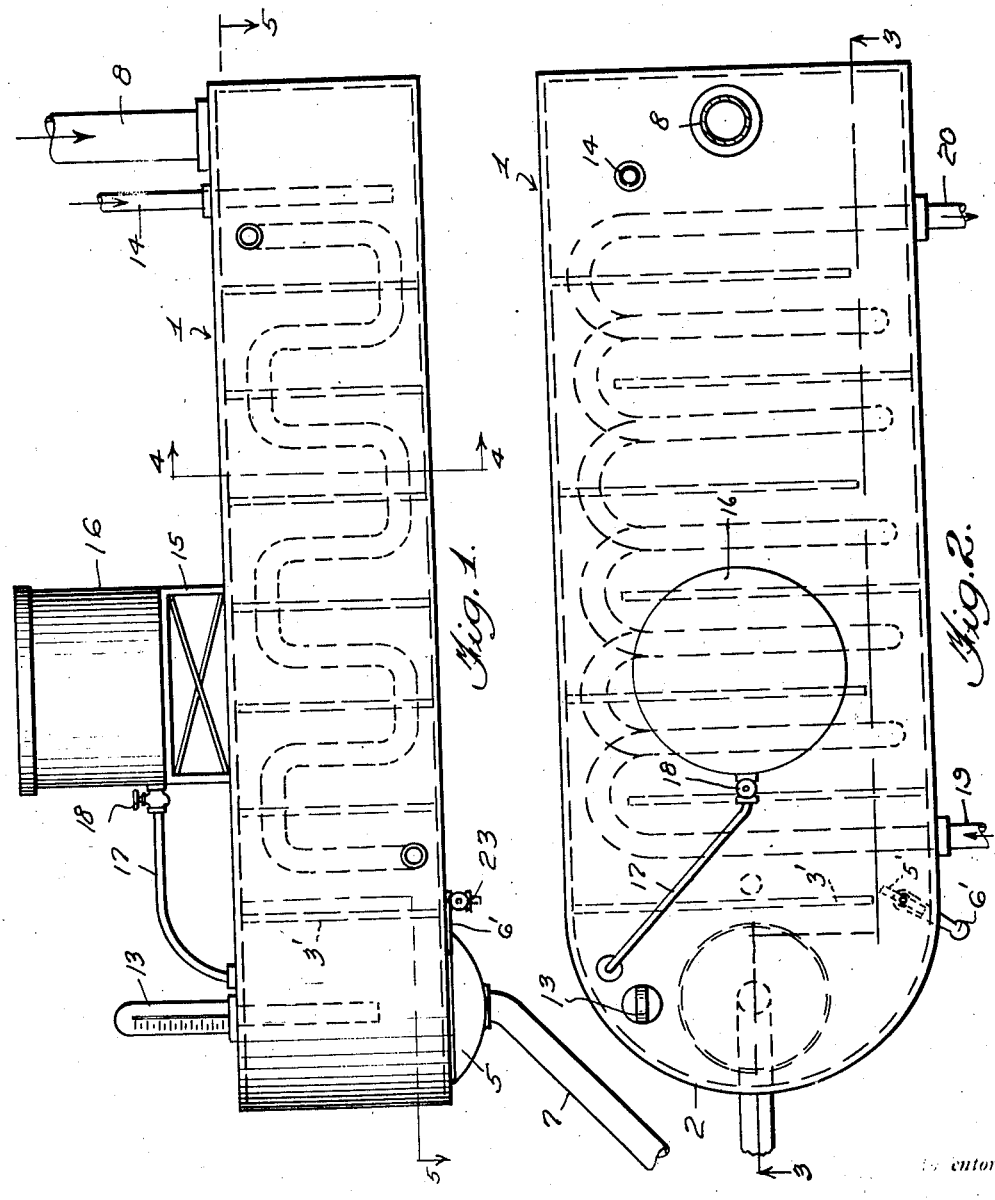
JULIUS FELSCH,
By Clarence A. O'Brien
and Harvey B. Jacobson
Attorneys Jan. 4, 1944. J. FELSCH 2,338,500
WATER CONDITIONING APPARATUS
Filed Feb. 11, 1942 2 Sheets-Sheet 2
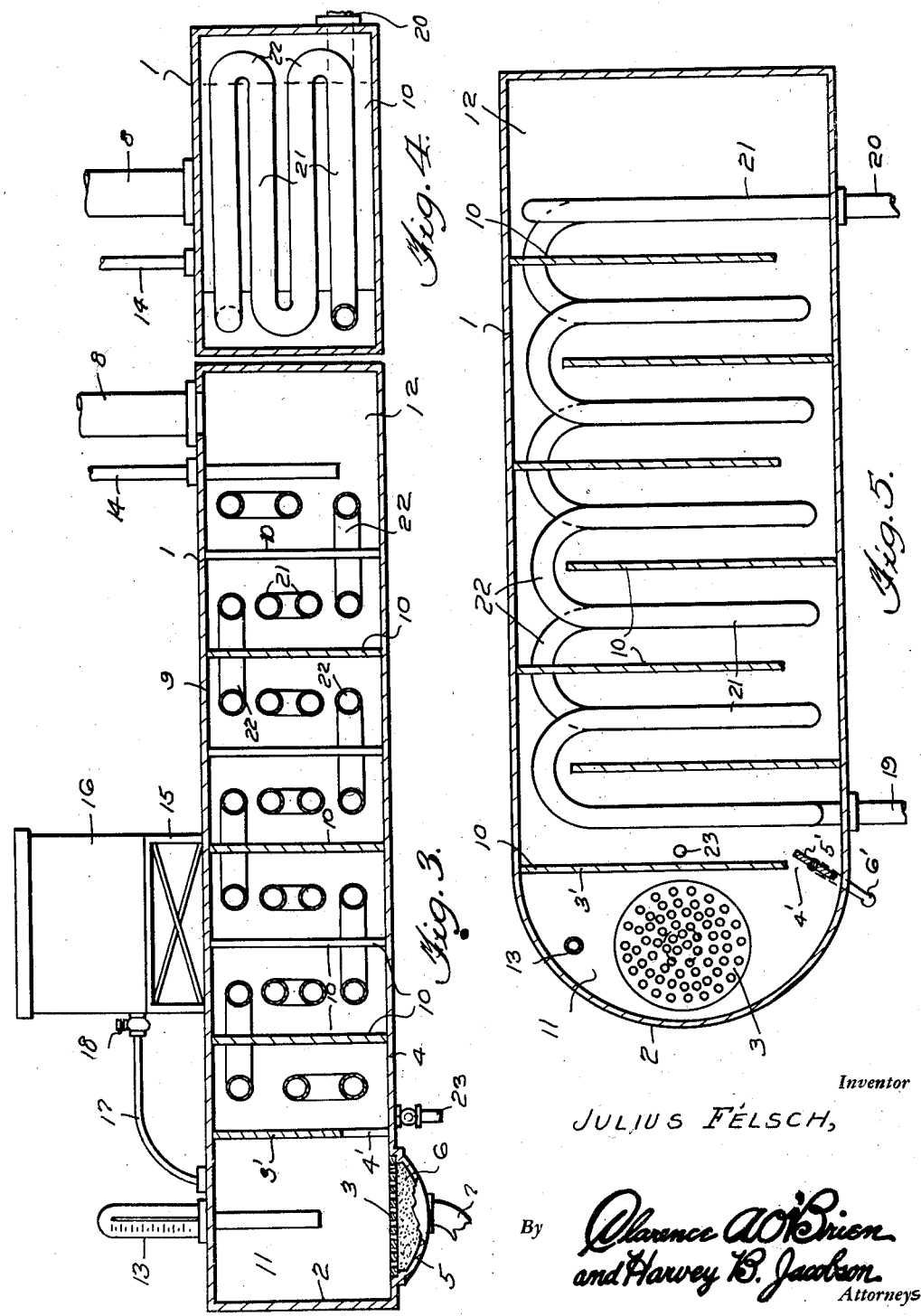
Inventor
JULIUS FELSCH,
By Clarence A. O'Brien
and Harvey B. Jacobson
Attorneys Patented Jan. 4, 1944

2,338,500

UNITED STATES PATENT OFFICE 2,338,500

WATER CONDITIONING APPARATUS

Julius Felsch, Altura, Minn.

Application February 11, 1942, Serial No. 430,447

2 Claims. (Cl. 210—14)

My invention relates to improvements in water conditioning apparatus, the principal object in view being to provide a simply constructed, easily installed, efficient apparatus for tempering, sterilizing and filtering the water used in washing freshly churned butter and other food products and which is adapted for use in the regular water supply line and can be easily regulated from the floor.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in side elevation of the preferred embodiment of my invention, Figure 2 is a view in top plan, Figure 3 is a view in longitudinal section taken on the line 3—3 of Figure 2, Figure 4 is a view in transverse section taken on the line 4—4 of Figure 1, and Figure 5 is a view in horizontal section taken on the line 5—5 of Figure 1.

Referring to the drawings by numerals, my improved apparatus, as illustrated, comprises a closed tank 1 of any suitable metal and which is of elongated rectangular form, substantially, with the exception of one end which is rounded, as at 2. In the center of the rounded end 2 a circular filter grate 3 is suitably countersunk in the bottom 4 of the tank 1 and a concave sump 5 is provided in said bottom below said grate 3 for a bed of filtering material 6. A discharge pipe 7 leads from the bottom of the sump 5. At the opposite end of the tank 1 an inlet pipe 8 extends downwardly to the top 9 of said tank.

Adjacent the filter grate 3 is a transverse partition 3′ forming a baffle plate having a bottom corner opening 4′ therein adjacent one side of the tank 1 adapted to be closed by a suitable flap valve 5′ operative by a hand lever 6′.

Intermediate the partition 3′ and the inlet pipe 8 is a plurality of laterally spaced, vertical, parallel baffle plates 10, extending from top to bottom of the tank 1 part way across the same, the ends of alternate baffle plates 10 being spaced from opposite sides of the tank, as best shown in Figure 5. The partition 3′ adjacent the end 2 of the tank forms together with said end a filtering chamber 11. The baffle plate 10 adjacent the opposite end of said tank forms together with said tank a water intake chamber 12.

A thermometer 13 is mounted in the top 9 of the tank 1 to extend into the filter chamber 11. A steam inlet pipe 14 is extended downwardly through the top 9 of said tank 1 into the water intake chamber 12.

On top of the tank 1, adjacent the filtering chamber 11 and supported by a suitable skeleton base 15, is a small storage tank 16 for chlorine solution or other suitable sterilizing liquid. A discharge pipe 17 with a control valve 18 interposed therein extends from the bottom of the storage tank 16 into communication with the filtering chamber 11 at the top thereof. The storage tank 16 may be formed of glass and the pipe 17 and valve 18 of rubber to resist the effect of the chlorine in the tank.

Extending through one side of the tank 1 adjacent opposite ends thereof are the inlet and outlet ends 19, 20 of a cooling coil unit adapted to be connected in any suitable manner to a source of supply under pressure, not shown, of a cooling liquid such as brine, ammonia, or ice water. The cooling unit comprises connected, vertically spaced, horizontal sections 21 extending crosswise between the baffle plates 10 and across the cooling chamber 12 with connecting bends 22 extending around the spaced edges of said plates 10.

A valved drain pipe 23 depends from the bottom of the tank 1 at any suitable point.

As will be understood, the water inlet pipe 8 is designed to be connected to a source of supply under pressure such as the house water line, not shown, and the discharge pipe 7 to washing apparatus, also not shown.

In the operation of the described apparatus, with cooling liquid circulating through the coil unit, the water is admitted to the cooling chamber 12. As the water is forced through the tank 1 around the baffle plates 10, its flow is retarded by said plates so as to be properly cooled by said coil unit, the temperature being indicated by the thermometer 13. The cooled water flows into the filter chamber 11 through opening 4′ and is there sterilized by mixing with sterilizing liquid admitted from the storage tank 16 to said filter chamber. The cooled and sterilized water passes through the filter bed 6 to the discharge pipe 7.

If the water becomes too cold it may be heated by injecting steam thereinto through the pipe 14 from any suitable source.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What is claimed as new is:

1. Apparatus for treating water comprising a closed tank, a plurality of vertical plates laterally spaced relatively in said tank and extending from top to bottom thereof and including alternating baffle plates having ends terminating short of opposite sides of the tank, one of said plates forming together with one end of the tank a water intake chamber and another of said plates forming together with the other end of the tank a filter chamber, a water inlet pipe extending into the top of the water intake chamber, and a cooling coil unit extending from the water intake chamber and comprising connected vertically spaced sections extending horizontally crosswise of the tank between said plates with connecting bends straddling the ends of some of said plates and passing through other plates.

2. Apparatus for treating water comprising a closed tank, a plurality of vertical plates laterally spaced relatively in said tank and extending from top to bottom thereof and including alternating baffle plates having ends terminating short of opposite sides of the tank, one of said plates forming together with one end of the tank a water intake chamber and another of said plates forming with the other end of the tank a filter chamber and having a bottom corner opening therein forming an inlet to the filter chamber, a water inlet pipe extending into the top of the water intake chamber, a cooling unit extending into the water intake chamber and comprising connected vertically spaced sections extending horizontally crosswise of the tank between said plates with connecting bends straddling the ends of some of said plates and passing through other plates, said unit terminating in an outlet end extending out of the tank adjacent said filter chamber and bypassing the same, and a gate valve in said bottom corner opening of said another plate for opening and closing the filter chamber.

JULIUS FELSCH.